July 12, 1960  M. YANULIS  2,944,586
EXTRUSION COATING APPARATUS
Filed April 20, 1956
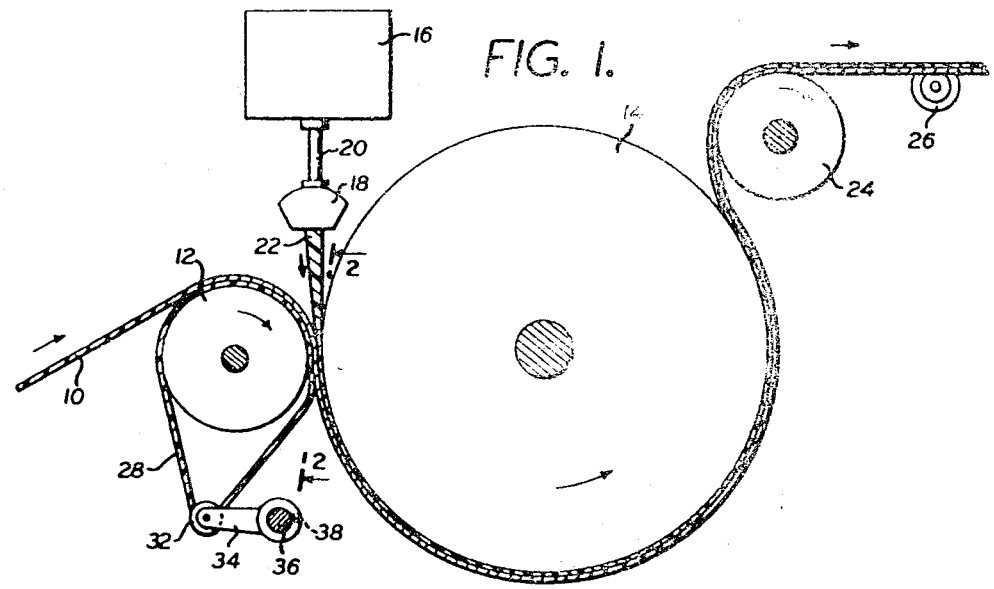
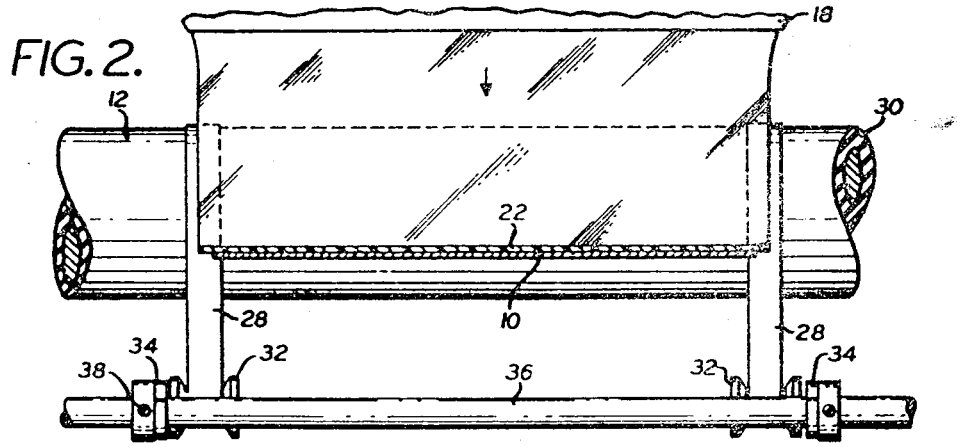
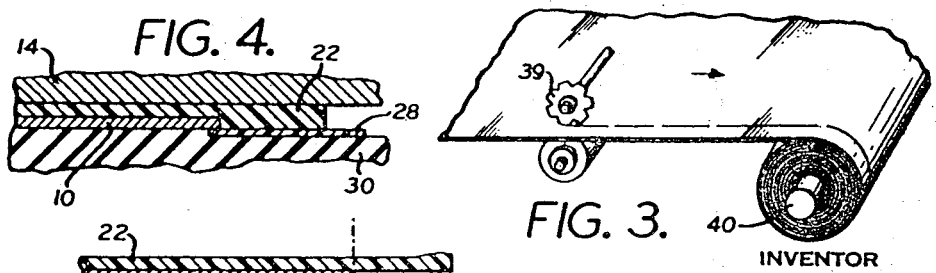
INVENTOR
MICHAEL YANULIS.
BY
Moore, Nolte, Crewe + Berry
ATTORNEYS.

United States Patent Office 2,944,586
Patented July 12, 1960

2,944,586

EXTRUSION COATING APPARATUS

Michael Yanulis, Rochelle Park, N.J., assignor to Lowe Paper Company, Ridgefield, N.J., a corporation of New Jersey Filed Apr. 20, 1956, Ser. No. 579,685

8 Claims. (Cl. 154—1)

This invention relates to the extrusion coating of web material such as paper, foil, cloth, etc, with plastic material. Although applicable to a considerable variety of coating materials, the invention will be illustratively disclosed and described in connection with only a limited number of plastics, with particular emphasis on polyethylene.

Extrusion coating consists in extruding a film of molten plastic from a slot shaped die which is arranged a short distance above a nip formed between a comparatively large water cooled drum and a comparatively small rubber faced backing roller. The length of the die slot is approximately equal to the length of the drum and the roller. The slot may be filled at its ends with deckles when narrower substrate webs are to be run.

A web of substrate material, such as paper, cloth, metallic foil, etc. is progressively unreeled and is threaded into the nip referred to, being generally preheated between the reel and the nip to eliminate moisture and to improve adhesion of the coating material. The molten plastic drops by gravity from the die slot into the same nip, so that it falls between the substrate and the cooling drum. At this point, it is pressed against the substrate by pressure applied to the backing roll, a usual pressure being in the range of 50–150 pounds per linear inch. The combined plastic coating and substrate then follow the periphery of the cooling drum for about 180°, so that the molten film of plastic is cooled to about room temperature, at which temperature the entire web can be stripped from the drum. Water is circulated in the shell of the drum to maintain a surface temperature of about 60–80° F. After being stripped from the drum, the coated web is wound onto a standard drum winder.

It is common practice to set the die for a considerably thicker film than that which is desired for the coated web. Therefore, the drum and the backing roller must run at a faster speed than that at which the plastic is delivered to the nip. In the case of polyethylene, the plastic is usually drawn down in the ratio of twenty to one; i.e., the guide slot is made .020 inch wide in order to produce a one mil. thickness of coating film. In drawing down the film of plastic, surface tension causes the film to "neck" down to a lesser width than that at which the die is set. This is similar to the effect observed when syrup is poured from a can. In extrusion coating of polyethylene, this contraction of the film causes a concentration of plastic toward the edges, and this produces a film having greater thickness at the edges of the coated web. These zones of increased thickness are sometimes referred to as the beads. As extrusion coating has been practiced heretofore, it has been impossible to avoid the formation of beads. As a consequence, it has been necessary to slit off from one half inch to one inch from each margin of the coated web. This is very wasteful, particularly if expensive substrates such as cellophane, metallic foil, and the like are used. Since the coating material cannot be practically separated from the substrate and reused, the coating material which forms the bead is necessarily wasted also.

This difficulty is overcome by the present invention by: (1) running the plastic film wider than the substrate in order to locate the beads outside the lateral boundary of the substrate and (2) providing thin, narrow belts to which the plastic will not adhere, upon the opposite ends of the rubber backing roll. By this expedient, the beneficial live properties of the rubber backing are retained, the beads are transferred outside the lateral bounds of the substrate where they can be trimmed off and recovered for further use without substantial sacrifice of substrate material, and contact of the plastic with the rubber surface of the roll to which it would adhere is avoided.

It is a feature that the narrow belts are adjustable axially of the backing roll in accordance with the width of the substrate, so that they lie just clear of the substrate or in slightly overlapping relation thereto.

Other objects and advantages will hereinafter appear.

In the drawing forming part of this specification:

Fig. 1 is a fragmentary view in vertical longitudinal sectional elevation showing a web which is being extrusion coated and apparatus involved in such coating;

Fig. 2 is a transverse, vertical sectional view taken on the line 2—2, of Fig. 1;

Fig. 3 is a fragmentary, perspective, view which shows the trimming of a marginal bead from the coated web while leaving the coated web intact;

Fig. 4 is an enlarged fragmentary sectional view showing the relationship of substrate, coating and belt when the substrate overlaps the belt slightly; and Fig. 5 is an enlarged fragmentary sectional view showing the relationship of the substrate and coating when the substrate does not overlap the belt, the line of trim being also indicated.

The apparatus used in carrying out the present improved process is conventional in all respects save for the addition of the narrow adjustable belt referred to. The process is also conventional, save for the widening of the coating relative to the substrate to locate the bead outside the substrate boundaries, the use of the non-adhering belts, and the trimming off of the plastic margin independently, or substantially independently, of the substrate.

In Fig. 1 a web 10 of paper, cellophane, metallic foil or other suitable material is drawn from a reel, (not shown), and is fed over a rubber faced roller 12 to a bight formed between the roller and a cooling drum 14. A pelletized plastic material, usually in the form of one-quarter inch cubes, is fed from a hopper 16 into a barrel (not shown) through a supply pipe 20. The barrel is heated with electrical heater units, and is fitted with a screw shaped shaft. The pelletized plastic is fed by the hopper into a chamber at the cool end of the barrel, and the rotating screw forces the pellets forward toward the discharge end of the barrel by positive displacement. As the pellets move forward, they are heated through the walls of the barrel, and become sufficiently molten to be forced through a screen pack. From the barrel the molten plastic passes to an electrically heated die 18, and out through a slot. This slot is bounded at its ends by adjustable deckles which are mounted on the bottom surface of the die body, below a manifold which runs the length of the die.

This type of extrusion is suitable for use with such materials as polyethylene, polyethylene wax blends (e.g., polyethylene (mol. wt. range 19,000–21,000) 50%, micro-crystalline wax 40%, poly isobutylene 5%), nylon (e.g., F.M.–3001, Du Pont), vinyl (e.g. polyvinyl chloride), acrylics (e.g. ethyl methacrylate), and copolymers of certain rubber compounds (e.g., styrene isobutylene), and any one of these materials may be used for practicing the invention. Plastics are extruded at temperatures ranging from 180° F. to as high as 700° F., depending upon the melting point range and the viscosity.

The plastic material 22 is fed in sheet form into the bight formed by the drum 14 and the rubber coated backing roller 12, being deposited between the pre-heated web or substrate 10 and the surface of the drum. In conformity with conventional practice, the sheet of plastic 22 as delivered, is much thicker than the coating desired. The drum 14 and the roller 12 are therefore run fast enough to draw the plastic sheet down to the desired thickness. In a typical case, the plastic would be reduced to one-twentieth of its original thickness.

The web 10 and the plastic coating are squeezed together between the roller 12 and the drum 14. Because the drum is cooled, and because of the composition and character of the drum surface, the plastic does not adhere to the drum. In this respect, there is no departure from conventional practice. The coated web continues around the drum through a substantial arc, more than 180° as shown, and passes thence over a roller 24 of substantial diameter, and over a roller table composed of flange rollers 26, only the first and last of which are shown.

As seen in Fig. 2, the plastic 22 as delivered to the web 10 is of somewhat greater width than the web, so that the beads will be caused to form outside the lateral boundaries of the web. Normally, this would cause the margins of the molten plastic to come into contact with the rubber surface of the roller 12 and to stick to the surface. This is prevented, however, by providing two thin, narrow belts 28 which extend outward from the side edges of the web 10 and protect the roller against contact with the plastic. The belts are so thin that the live, resilient properties of the rubber roller coating 30 are still fully utilized. The belts may be made to run in edge to edge relation with the web 10, or they may be caused to extend slightly under the substrate web. In each case little or none of the web 10 is required to be trimmed along with the overhanging plastic margins. In either situation a very important economy of web material is realized.

It is important that the belts 28 be made of a material to which the plastic material will not adhere. For this purpose, I have found a belt of fiber glass cloth impregnated with silicone rubber to be very satisfactory. Specifically, this material as actually used by me, is sold under the trade designation "Cohrlastic 100 Silicone Rubber." The strips of this material are .015 inch thick. Another type of strip material which I have found satisfactory is a fiber glass cloth coated on both sides with Teflon (polytetrafluoroethylene). It can be had in thicknesses of .010 inch and .015 inch, either of which is satisfactory for the present purpose.

In order that the belts 28 may be properly related to substrate webs 10 of different widths, provision is made for adjusting the belts axially of the roller 12. For this purpose, guide pulleys 32 are provided. Each pulley 32 is rotatably supported in an arm 34. The arms 34 are adjustably mounted on a rod 36 which extends parallel to the axis of the roller 12. Each arm may be fixed in adjusted position by the tightening of a set screw 38 which is threaded through it into engagement with the rod 36. While it has been said that the plastic does not stick to the belts 28, there is some tendency of the plastic to stick, a fact which is illustrated in Fig. 1 by showing a belt as seeking to follow the drum 14. The plastic does, however, pull loose from the belts without ordinarily subjecting them to damaging strain.

As the coated web leaves the roller table formed by the rollers 26, it is fed past rotary slitter discs 39. The discs 39 are notched so that the margins are not completely detached but may be reeled as part of the web on a frictionally driven shaft 42. After reeling the margins can be readily separated from the reeled, coated web.

In making belts from the strip material referred to above, the ends of the strip are carefully cleaned with a suitable cleaner such as carbon tetracholride. Adhesive (No. 259 from Connecticut Hard Rubber Company) is applied to one side of the clean strip with a spatula, and the opposite end of the strip is placed on it to form a continuous belt. Any excess of adhesive is then wiped off. The joint of the belt is then placed in a heated press at 270° F. and under a pressure of 2000 pounds per square inch, and maintained under those conditions for twenty minutes.

While the invention has been described with particular reference to specific embodiments, it is to be understood that it is not limited thereto, but is to be construed broadly and restricted solely by the scope of the appended claims.

I claim:

1. In extrusion coating apparatus, in combination, a cooling drum, a rubber faced pressure roller opposed thereto, said drum and roller forming a bight through which a substrate web is fed, a plastic extruder disposed to deposit in said bight between the substrate web and the cooling drum a sheet of plastic material which is wider than the substrate web to form plastic strips on each side of said substrate web and to form beads in the margins of the plastic sheet outside the lateral boundaries of the substrate web, thin, narrow, flexible protective belts trained to run on opposite end portions of the roller in positions to protect the roller against contact with the plastic material, said belts being composed of material which is non-adherent to the plastic material, means to feed said substrate web with said plastic strips integral therewith around and in contact with said drum to cool said plastic, and means to transfer said substrate web with the integral plastic strips away from said cooling drum.

2. In extrusion coating apparatus, in combination, a cooling drum, a rubber faced pressure roller opposed thereto, said drum and roller forming a bight through which a substrate web is fed, a plastic extruder disposed to deposit in said bight between the substrate web and the cooling drum a sheet of plastic material which is wider than the substrate web to form plastic strips on each side of said substrate web including beads formed in the margins of the plastic strips which lie outside the lateral boundaries of the substrate web, thin, narrow, flexible protective belts trained to run on opposite end portions of the roller in positions to protect the roller against contact with the plastic material, said belts being composed of fiberglass impregnated with silicone rubber, means to feed said substrate web with said plastic strips integral therewith around and in contact with said cooling drum to cool said plastic, and means to transfer said substrate web together with the integral plastic strips away from said drum.

3. In extrusion coating apparatus, in combination, a cooling drum, a rubber faced pressure roller opposed thereto, said drum and roller forming a bight through which a substrate web is fed, a plastic extruder disposed to deposit in said bight between the substrate web and the cooling drum a sheet of plastic material which is wider than the substrate web to form plastic strips on each side of said substrate web including beads formed in the margins of the plastic strips which lie outside the lateral boundaries of the substrate web, thin, narrow, flexible protective belts trained to run on opposite end portions of the roller in positions to protect the roller against contact with the plastic material, said belts being composed of fiberglass which is coated on both faces with polytetrafluoroethylene, means to feed said substrate web with said plastic strips integral therewith around and in contact wtih said cooling drum to cool said plastic, and means to transfer said substrate web with the integral plastic strips away from said drum.

4. In extrusion coating apparatus, in combination, a cooling drum, a rubber faced pressure roller opposed thereto, said drum and roller forming a bight through which a substrate web is fed, a plastic extruder disposed to deposit in said bight between the substrate web and the cooling drum a sheet of plastic material which is wider than the substrate web to form plastic strips on each side of the substrate web and to form beads in the margins of the plastic sheet outside the lateral boundaries of the substrate web, a set of spaced guide pulleys rotatably mounted adjacent said pressure roller, thin, narrow, flexible protective belts trained to run on opposite end portions of the roller and over a respective one of said guide pulleys in positions to protect the roller against contact with the plastic material, said belts being composed of material which is non-adherent to the plastic material, means to feed said substrate web with said plastic strips integral therewith around in contact with said drum to cool said plastic, and means to transfer said substrate web with the integral plastic strips away from said drum.

5. In extrusion coating apparatus according to claim 4, including means to adjustably position said guide pulleys.

6. An extrusion apparatus according to claim 4 including means to sever the overlapping edges of said plastic after said substrate web has left said drum.

7. An extrusion apparatus according to claim 4 including slit-perforating means to cut the overlapping edges of said plastic super-jacent the edges of said substrate web, and means to wind said substrate web and said perforated plastic into a roll.

8. In extrusion coating apparatus, in combination, a cooling drum, a rubber faced pressure roller opposed thereto, said drum and roller forming a bight through which a substrate web is fed, a plastic extruder disposed to deposit in said bight between the substrate web and the cooling drum a sheet of plastic material which is wider than the substrate web to form plastic strips on each side of said substrate web, flexible protective belts trained to run on opposite end portions of the roller in positions to protect the roller against contact with the plastic material, said belts being composed of material which is non-adherent to the plastic material, means to feed said substrate web with said plastic strips integral therewith around and in contact with said drum to cool said plastic, and means to transfer said substrate web with the integral plastic strips away from said cooling drum.

References Cited in the file of this patent

UNITED STATES PATENTS

| | | |
|---|---|---|
| 1,285,903 | Bazzoni | Nov. 26, 1918 |
| 1,476,988 | Latta | Dec. 11, 1923 |
| 1,851,761 | Everett | Mar. 29, 1932 |
| 2,238,013 | Collings et al. | Apr. 8, 1941 |
| 2,353,789 | Schieman | July 18, 1944 |
| 2,364,435 | Foster et al. | Dec. 5, 1944 |
| 2,384,657 | Tyler | Sept. 11, 1945 |
| 2,546,379 | Woodring et al. | Mar. 27, 1951 |
| 2,607,712 | Sturken | Aug. 19, 1952 |
| 2,690,206 | Mueller | Sept. 28, 1954 |
| 2,779,387 | Schairer | Jan. 29, 1957 |